United States Patent Office 3,210,243
Patented Oct. 5, 1965

3,210,243
COMPOUNDS AND USE FOR REPELLING HOUSEFLIES
Lyle D. Goodhue and Rector P. Louthan, Bartlesville, Okla., assignors to Phillips Petroleum Company, a corporation of Delaware
No Drawing. Filed Aug. 7, 1961, Ser. No. 129,552
5 Claims. (Cl. 167—22)

This invention relates to new compounds. The invention also relates to the use of the new compounds for repelling houseflies. In one of its aspects the invention relates to 2-hydroxy-3-chloropropyl alkyl sulfide wherein the alkyl is selected from normal-, secondary-, and tertiary-octyl. In another one of its aspects, the invention relates to 2-hydroxy-3-chloropropyl alkyl sulfoxide wherein the alkyl is selected from n-, secondary-, and tertiary-octyl. In a further aspect, the invention relates to the repelling of houseflies by subjecting said flies to the action of at least one of the new compounds of the invention.

We have now conceived that new compounds as herein disclosed should be prepared and that these compounds may have certain specific utilities. More specifically, the specific compounds which are disclosed herein have been prepared and have been found effective as repellents for houseflies.

It is an object of this invention to provide new compounds. Another object of this invention is to provide a method for producing the new compounds. It is a further object of this invention to produce 2-hydroxy-3-chloropropyl alkyl sulfides and 2-hydroxy-3-chloropropyl alkyl sulfoxides wherein the alkyl can be n-, secondary-, and tertiary-octyl. It is a further object of this invention to provide a new method for effectively repelling houseflies. It is a further object of this invention to provide a novel insect repellent.

Other aspects, objects and the several advantages of the invention are apparent from this disclosure and the appended claims.

According to the present invention compounds having the following structural characteristics

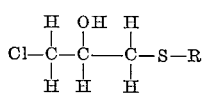

and

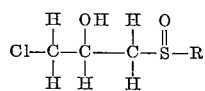

wherein R is selected from the group consisting of n-, secondary-, and tertiary-octyl radicals has been prepared.

According to the invention the compounds are prepared by heating the alkyl mercaptan and epichlorohydrin as herein described to obtain sulfide and later oxidizing the sulfide to the sulfoxide also as herein described.

Also according to the invention there are provided an insect repellant composition and method employing the above compounds, or one of them, in the said composition and method.

The compounds can be prepared by a variety of methods. For example, the sulfides can be prepared by reacting epichlorohydrin with an octyl mercaptan in the presence of an alkanesulfonic acid. The sulfoxides can be prepared from the corresponding sulfide by oxidation with hydrogen peroxide or an organic peracid such as peracetic acid.

EXAMPLE I

A series of runs were carried out in which 3-chloro-2-hydroxypropyl n-octyl sulfide, and 3-chloro-2-hydroxypropyl n-octyl sulfoxide were synthesized and tested as repellants for houseflies.

In the synthesis of the sulfide, 438 grams of n-octyl mercaptan and 5 grams of coconut charcoal were charged to a 1-liter, 3-necked flask which was equipped with a stirrer, dropping funnel and condenser. The mixture was heated to 80° C. and approximately 50 cc. of epichlorohydrin were charged dropwise. No sign of reaction had taken place at this time. 5 cc. of mixed alkanesulfonic acids (mixed acids sold as Endoil) were then charged to the flask, and the remainder of a total 278 gram charge of epichlorohydrin was added. The mixture was then heated to 122° C., reflux temperature, and refluxed for 1 hour. The temperature then rose to 132° C. The material was then allowed to stand overnight, and the following day was heated to 155° C. The reaction mixture was held at 140–155° C. for approximately 30 minutes. The resulting mixture was then distilled and 145 grams of unreacted material was recovered. A crude product, boiling at 86–157 at 3 mm. mercury absolute pressure and amounting to 398 grams was then redistilled. There was obtained 269.3 grams of a material boiling at 137–140 at 0.8 mm. mercury absolute pressure. The refractive index of this material was $n_D^{20} = 1.4865$.

The sulfoxide was prepared in the following manner: 150 grams of the above prepared sulfide were dissolved in 200 cc. of methanol. The resulting solution was heated to reflux and 71 grams of 30% aqueous hydrogen peroxide were added dropwise over a 20–30 minute period. The resulting mixture was then diluted with approximately 500 cc. of water, after which the mixture was extracted with ether. The organic phase was separated off and the ether was stripped from this phase at 75° C. and 2 mm. mercury absolute pressure. A crystalline material amounting to 150.8 grams was obtained.

Compounds of the invention which can be employed as repellents according to this invention are 3-chloro-2-hydroxypropyl n-octyl sulfide, 3-chloro-2-hydroxypropyl n-octyl sulfoxide, 3-chloro-2-hydroxypropyl sec-octyl sulfide, 3-chloro-2-hydroxylpropyl sec-octyl sulfoxide, 3-chloro-2-hydroxypropyl tert-octyl sulfide, and 3-chloro-2-hydroxy-propyl tert-octyl sulfoxide.

The compounds of the invention when utilized as repellents can be applied in the form of solutions, emulsions, dusts, wettable powders, aerosols and the like. A preferred method of application is by means of solutions. Suitable solvents for the application of these repellants include kerosene, aromatics such as xylene, ketones such as acetone, isoparaffinic hydrocarbons such as are sold under the trade name of Soltrols and the like.

In applying these materials, the solutions, emulsions, etc., will generally contain from 0.05 to 20 weight percent of the active repellent. Whatever the method of application, the repellents will be applied to surfaces from which houseflies are to be repelled in a manner so as to deposit from about 0.1 to about 20 grams per 100 square feet. If the materials are applied as space spray by means of aerosols, spraying will usually be adjusted to suspend approximately 0.001 to 5 grams per 100 cubic feet.

EXAMPLE II

The above-prepared compounds were then tested for repellency to houseflies by a sandwich bait method. In this test, a smooth, thin film of unsulfured molasses was spread on a 1" x 4" strip of cardboard leaving a margin of at least ¼" on all sides. Porous strips of lens paper were then impregnated with acetone solutions containing the compound to be tested. After drying the strips in air for six hours the strips were stapled over the molasses-coated cards. The cards were then placed in cages containing houseflies over five days old which had been starved for six hours. Periodic counts of the flies feeding on the strips were taken during a 2.75 hour test period. The results of these tests are expressed below as Table I.

Table I

| Compound[1] | Conc. of Solution, Wt. Percent | 5 | 15 | 30 | 45 | 60 | 90 | 120 | 150 | 165 | Estimated Molasses after 24 Hours Percent |
|---|---|---|---|---|---|---|---|---|---|---|---|
| A | 1.0 | 0 | 0 | 0 | 0 | 0 | 0 | 0 | 0 | 0 | Not Est. |
| B | 1.0 | 0 | 0 | 0 | 0 | 0 | 0 | 0 | 0 | 0 | Not Est. |
| A | 0.5 | 0 | 0 | 0 | 0 | 0 | 0 | 0 | 0 | 0 | 25. |
| B | 0.5 | 0 | 0 | 0 | 0 | 0 | 0 | 0 | 0 | 0 | 0. |
| A | 0.25 | 0 | 0 | 0 | 0 | 0 | 0 | 0 | 41 | 46 | Not Est. |

[1] A=3-chloro-2-hydroxypropyl n-octyl sulfide; B=3-chloro-2-hydroxypropyl n-octyl sulfoxide.

The above-prepared sulfide and sulfoxide were tested as repellents for stables flies, roaches and fruit flies. Neither compound was effective as repellents for these insects.

Reasonable variation and modification are possible within the scope of the foregoing disclosure and the appended claim to the invention the essence of which is that 2-hydroxy-3-chloropropyl alkyl sulfides and sulfoxides wherein the alkyl is as herein defined have been conceived, prepared and found to be excellent repellants for houseflies.

We claim:

1. 2-hydroxy-3-chloropropyl alkyl sulfide wherein the alkyl is selected from the group consisting of n-, secondary-, and tertiary-octyl.

2. 2-hydroxy-3-chloropropyl alkyl sulfoxide wherein the alkyl is selected from the group consisting of n-, secondary-, and tertiary-octyl.

3. A method of repelling an insect which comprises subjecting same to the action of at least one compound selected from the group consisting of 2-hydroxy-3-chloropropyl alkyl sulfide and 2-hydroxy-3-chloropropyl alkyl sulfoxide wherein the alkyl is selected from the group consisting of n-, secondary-, and tertiary-octyl.

4. A method of repelling houseflies which comprises subjecting the same to the action of at least one compound selected from the group consisting of 2-hydroxy-3-chloropropyl alkyl sulfide and sulfoxide wherein the alkyl is selected from the group consisting of n-, secondary-, and tertiary-octyl.

5. A composition repellant to insects which comprises at least one compound selected from the group consisting of 2-hydroxy-3-chloropropyl alkyl sulfide and sulfoxide wherein the alkyl is selected from the group consisting of n-, secondary-, and tertiary-octyl, the said compound being dispersed in an insect repellant adjuvant carrier.

References Cited by the Examiner

UNITED STATES PATENTS

| 2,863,799 | 12/58 | Goodhue et al. | 167—22 |
| 2,926,118 | 2/60 | Mahan | 167—22 |
| 2,944,932 | 7/60 | Stansbury et al. | 167—22 |
| 3,034,950 | 5/62 | Goodhue et al. | 167—22 |

JULIAN S. LEVITT, *Primary Examiner.*

MORRIS O. WOLK, LEWIS GOTTS, *Examiners.*